United States Patent
Cai et al.

(10) Patent No.: US 9,495,453 B2
(45) Date of Patent: Nov. 15, 2016

(54) RESOURCE DOWNLOAD POLICIES BASED ON USER BROWSING STATISTICS

(75) Inventors: Rui Cai, Beijing (CN); Xiaodong Fan, Sammamish, WA (US); Lei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 485 days.

(21) Appl. No.: 13/114,643

(22) Filed: May 24, 2011

(65) Prior Publication Data

US 2012/0303606 A1  Nov. 29, 2012

(51) Int. Cl.
*G06F 7/00* (2006.01)
*G06F 17/30* (2006.01)
*G06F 17/00* (2006.01)

(52) U.S. Cl.
CPC ..... *G06F 17/30864* (2013.01); *G06F 17/3089* (2013.01); *G06F 17/30705* (2013.01); *G06F 17/30861* (2013.01); *G06F 17/30899* (2013.01)

(58) Field of Classification Search
CPC ............ G06F 17/30864; G06F 17/3089; G06F 17/30705; G06F 17/30861
USPC ....................................................... 707/709
See application file for complete search history.

(56) References Cited

U.S. PATENT DOCUMENTS

| | | | |
|---|---|---|---|
| 6,182,085 B1 * | 1/2001 | Eichstaedt et al. | 707/999.102 |
| 7,240,064 B2 * | 7/2007 | Risvik et al. | 707/709 |
| 7,599,920 B1 | 10/2009 | Fox et al. | |
| 7,627,613 B1 * | 12/2009 | Dulitz | G06F 17/30864 |
| 7,827,166 B2 | 11/2010 | Garg et al. | |
| 2005/0165753 A1 * | 7/2005 | Chen et al. | 707/3 |
| 2007/0038620 A1 | 2/2007 | Ka et al. | |
| 2010/0073374 A1 * | 3/2010 | Gao et al. | 345/440 |
| 2010/0287152 A1 | 11/2010 | Hauser | |
| 2010/0293116 A1 | 11/2010 | Feng et al. | |

OTHER PUBLICATIONS

Abiteboul, et al., "Adaptive On-Line Page Importance Computation", WWW2003, May 20-24, 2003, Budapest, Hungary, retrieved at <<http://leo.saclay.inria.fr//publifiles/gemo/GemoReport-290.pdf>>, 11 pages.

Baeza-Yates, et al., "Crawling a Country: Better Strategies than Breadth-First for Web Page Ordering", WWW 2005, May 10-14, 2005, Chiba, Japan, retrieved at <<http://www.inf.udec.cl/~andrea/papers/www05.pdf>>, 8 pages.

(Continued)

*Primary Examiner* — Kannan Shanmugasundaram

(74) *Attorney, Agent, or Firm* — Sandy Swain; Micky Minhas; Lee & Hayes, PLLC

(57) ABSTRACT

Web crawling polices are generated based on user web browsing statistics. User browsing statistics are aggregated at the granularity of resource identifier patterns (such as URL patterns) that denote groups of resources within a particular domain or website that share syntax at a certain level of granularity. The web crawl policies rank the resource identifier patterns according to their associated aggregated user browsing statistics. A crawl ordering defined by the web crawl polices is used to download and discover new resources within a domain or website.

20 Claims, 6 Drawing Sheets

(56) References Cited

OTHER PUBLICATIONS

Baeza-Yates, "Crawling the Infinite Web: Five Levels are Enough", Lecture Notes in Computer Science, 2004, vol. 3243/2004, retrieved on Jan. 12, 2011 at <<http://www.chato.cl/papers/baeza04_crawling_infinite_web.pdf>>, 12 pages.

Berners-Lee, et al., "Uniform Resource Identifier (URI): Generic Syntax", The Internet Society 2005, retrieved on Jan. 12, 2011 at <<http://tools.ietf.org/html/rfc3986>>, 62 pages.

Brin, et al., "The Anatomy of a Large-Scale Hypertextual Web Search Engine", Proceedings of the Seventh International World Wide Web Conference, Computer Networks and ISDN Systems, vol. 30, Issues 1-7, Apr. 1998, retrieved at <<http://wx.bsjh.tcc.edu.tw/~t2003013/wiki/images/8/8f/Anatomy.pdf>>, 26 pages.

Cai, et al., "iRobot: An Intelligent Crawler for Web Forums", WWW 2008 / Refereed Track: Search-Crawlers, Apr. 21-25, 2008, Beijing, China, retrieved at <<http://www2008.org/papers/pdf/p447-caiA.pdf>>, pp. 447-456.

Chakrabarti, et al., "Focused crawling: a new approach to topic-specific Web resource discovery", Published by Elsevier Science B.V., retrieved at <<http://www.cse.iitb.ac.in/~soumen/doc/www1999f/pdf/www1999f.pdf>>, May 1999, pp. 545-562.

Cheng, et al., "Actively Predicting Diverse Search Intent from User Browsing Behaviors", Apr. 26-30, 2010, WWW2010, Raleigh, NC, USA, retrieved at <<http://research.microsoft.com/pubs/131466/p221.pdf>>, pp. 221-230.

Cho, et al., "Efficient Crawling Through URL Ordering", Proceedings of the Seventh International World Wide Web Conference, Computer Networks and ISDN Systems, vol. 30, Issues 1-7, Apr. 1998, retrieved at <<http://oak.cs.ucla.edu/~cho/papers/cho-order.pdf>>, 18 pgs.

Cho, et al., "RankMass Crawler: A Crawler with High Personalized PageRank Coverage Guarantee", VLDB '07, Sep. 23-28, 2007, Vienna, Austria, retrieved at <<http://www.eldoradoseo.com/wp-content/SEO-PDFS/RankMass-Crawler.pdf>>, pp. 375-386.

Fetterly, et al., "The Impact of Crawl Policy on Web Search Effectiveness", SIGIR'09, Jul. 19-23, 2009, Boston, Massachusetts, USA, retrieved at <<https://research.microsoft.com/pubs/81492/fp083-fetterly.pdf>>, 8 pages.

Grunwald, "A Tutorial Introduction to the Minimum Description Length Principle", Cornwell University, Jun. 4, 2004, retrieved at <<http://arxiv.org/PS_cache/math/pdf/0406/0406077v1.pdf>>, pp. 1-80.

Jansen, et al., "Investigating Customer Click through Behaviour with Integrated Sponsored and Non-sponsored Results", Int. J. Internet Marketing and Advertising, vol. 5, Nos. 1/2, 2009, retrieved at <<http://www.isaacsunyer.com/wp-content/uploads/2009/06/jansen_click_through_sponsored_links.pdf>>, pp. 74-94.

Jiang, et al., "Web Search/Browse Log Mining: Challenges, Methods, and Applications", World Wide Web Conference Series—WWW2010, retrieved at <<http://research.microsoft.com/en-us/people/djiang/web_search_and_browse_log_mining.pdf>>, Apr. 2011, 308 pages.

Joachims, "Optimizing Search Engines using Clickthrough Data", SIGKDD'02, Edmonton, Alberta, Canada, Jul. 2002, retrieved at <<http://www.cs.cornell.edu/People/tjpublications/joachims_02c.pdf>>, 10 pages.

Kleinberg, "Authoritative Sources in a Hyperlinked Environment", Journal of the ACM, vol. 46, No. 5, Sep. 1999, retrieved at <<http://www.cs.cmu.edu/afs/cs/project/pscico-guyb/realworld/www/papers/kleinberg.pdf>>, pp. 604-632.

Lei, et al., "A Pattern Tree-based Approach to Learning URL Normalization Rules," WWW2010, Apr. 26-30, 2010, Raleigh, NC, USA, retrieved at <<http://www.yanke.org/papers/www2010urlnorm.pdf>>, pp. 611-620.

Li, et al., "Generalizing Case Frames Using a Thesaurus and the MDL Principle", Association for Computational Linguistics, vol. 24, No. 2, Jun. 1998, retrieved at <<http://acl.ldc.upenn.edu/J/J98/J98-2002.pdf>>, pp. 217-244.

Li, et al., "Research of Web Information Mining by using Crawler Techniques", Proceedings of the 2008 IEEE International Conference on Information and Automation, Jun. 20-23, 2008, Zhangjiajie, China, retrieved at <<http://ieeexplore.ieee.org/stamp/stamp.jsp?tp=&arnumber=4608260>>, pp. 1603-1607.

Lieberman, "Letizia: An Agent That Assists Web Browsing", AAAI Technical Report FS-95-03, retrieved at <<http://www.aaai.org/Papers/Symposia/Fall/1995/FS-95-03/FS95-03-016.pdf>>, Fall 1995, pp. 97-102.

Menczer, et al., "Topical Web Crawlers: Evaluating Adaptive Algorithms", ACM Transactions on Internet Technology, vol. 4, No. 4, Nov. 2004, retrieved at <<http://www.informatics.indiana.edu/fil/Papers/TOIT.pdf>>, pp. 378-419.

Meo, et al., "Designing and Mining Web Applications: A Conceptual Modeling Approach", retrieved on Jan. 5, 2011 at <<http://www.di.unito.it/~meo/Pubblicazioni/Meo-Matera-WebConcDesignMining.doc>>, Chapter 8, iWeb Data Management Practices: Emerging Techniques and Technologies, Idea Group Inc., 2007, 18 pages.

Olston, et al., "Web Crawling", Foundations and Trends in Information Retrieval, vol. 4, No. 3 (2010), pp. 175-246.

Page, et al., "The PageRank Citation Ranking: Bringing Order to the Web", ODU, Norfolk, Jan. 31, 2007, retrieved at <<http://www.cs.odu.edu/~mln/teaching/cs791-s07/?method=getElement&element=~week4~KleinVuppala.pdf>>, 29 pages.

Pandey, et al., "Crawl Ordering by Search Impact", WSDM'08, Feb. 11-12, 2008, Palo Alto, California, USA, retrieved at <<http://www.cs.cmu.edu/~spandey/wsdm-pandey.pdf>>, 11 pages.

Pandey, et al., "User-Centric Web Crawling", WWW 2005, May 10-14, 2005, Chiba, Japan, retrieved at <<http://www2005.org/cdrom/docs/p401.pdf, pp. 401-411.

Pant, et al., "Learning to Crawl: Comparing Classification Schemes", ACM Transactions on Information Systems, vol. 23, No. 4, Oct. 2005, retrieved at <<http://home.business.utah.edu/actgp/Papers/Learning%20to%20Crawl%20Comparing%20Classification%20Schemes.pdf>>, pp. 430-462.

Pinkerton, "Finding What People Want: Experiences with the WebCrawler", Second International WWW Conference, Oct. 1994, retrieved at <<http://thinkpink.com/bp/WebCrawler/WWW94.html>>, 12 pages.

Rissanen, "Modeling by Shortest Data Description", Automatica, vol. 14, Issue 5, Sep. 1978, pp. 465-471.

Rissanen, et al., "Stochastic Complexity and Modeling", The Annals of Statistics 1986, vol. 14, No. 3, retrieved at <<http://projecteuclid.org/DPubS/Repository/1.0/Disseminate?view=body&id=pdf_1&handle=euclid.aos/1176350051>>, Sep. 1986, pp. 1080-1100.

"Robots Exclusion Standard," retrieved on Jan. 11, 2011 at <<http://en.wikipedia.org/wiki/Robots_exclusion_standard, 5 pages.

Vidal, et al., "Structure-Driven Crawler Generation by Example", SIGIR'06, Aug. 6-11, 2006, Seattle, WA, pp. 292-299.

Wang, et al., "Exploring Traversal Strategy for Web Forum Crawling", SIGIR'08, Jul. 20-24, 2008, Singapore, retrieved from <<http://research.microsoft.com/en-us/um/people/weilai/download/papers/exploring%20traversal%20strategy%20for%20web%20forum%20crawling_sigir08-wang.pdf>>, 8 pages.

White, et al., "Studying the Use of Popular Destination to Enhance Web Search Interaction", SIGIR'07, Jul. 23-27, 2007, Amsterdam, The Netherlands, retrieved at <<http://research.microsoft.com/en-us/um/people/ryenw/papers/WhiteSIGIR2007a.pdf>>, 8 pages.

Zaiane, et al., "Discovering Web Access Patterns and Trends by Applying OLAP and Data Mining Technology on Web Logs", Proceedings IEEE International Forum on Research and Technology Advances in Digital Libraries, 1998, ADL 98, Apr. 22-24, 1998, date of current version Aug. 6, 2002, retrieved at <<http://ieeexplore.ieee.org/stamp/stamp.jsp?tp=&arnumber=670376>>, 11 pages.

* cited by examiner

RESOURCE DOWNLOAD POLICIES BASED ON USER BROWSING STATISTICS

BACKGROUND

Search engine providers download information about web pages and other resources so that the information can later be searched by search engine users. Web crawlers are employed to download the information, but it is not feasible for a web crawler to download and store all content from all websites on the Internet. Web crawl policies therefore attempt to identify Internet information resources (such as web pages, media files, and others) that are most interesting to users, so that the "interesting" information can be given priority in downloading and storing. In practice, this often means identifying the Uniform Resource Locators (URLs), Uniform Resource Identifiers (URIs), or other types of resource identifiers associated with interesting resources within one or more websites. This is done so that information about the interesting resources can be downloaded and stored for later search engine retrieval. Various web crawl ordering policies differ in part in how they identify interesting resources.

Many web crawl ordering policies attempt to determine "interesting" web pages based on web-link structure. For example, a "breadth-first" policy is based on an assumption that pages located within a few links to a website's portal are more likely to be interesting to users. Other strategies like "in-degree" and "PageRank®" take into account sophisticated navigational structure information. Some policies prioritize web pages according to content's relevance to pre-defined semantic topics. Other policies consider the rank of a web page in returned search engine query results and the number of actual user clicks that the web page receives in the search results (e.g., URLs with lots of clicks and higher ranks are promoted in crawl order). Other approaches attempt to optimize the crawl policy on a per-website basis.

The Internet is increasingly dynamic. For example, much modern website content is user-generated, websites are organized with deep link levels, and web pages are created and retired much more rapidly than in the past. Conventional web crawl policies do not handle this dynamism well.

BRIEF SUMMARY

This Summary is provided in order to introduce simplified concepts of resource download policy generation, which are further described below in the Detailed Description. This summary is not intended to identify essential features of the claimed subject matter, nor is it intended for use in determining the scope of the claimed subject matter.

This disclosure relates to methods and systems to determine resource download policies (such as web crawl ordering policies) that are based on user browsing statistics. User browsing statistics are aggregated at the granularity of resource identifier patterns (such as URL patterns). A resource identifier pattern denotes a group of resource identifiers within a particular domain or website that share syntax at a certain level of granularity and that have similar user browsing behaviors. While conventional crawl policies may use individual resource identifiers as their basic units, resource download policies according to embodiments of the present disclosure utilize resource identifier patterns as their basic unit in crawl ordering policies. Resource identifier patterns are more stable than individual resource identifiers over time, and determining resource download policies based on resource identifier patterns is less computationally complex than determining web crawl policies based on individual resource identifiers.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
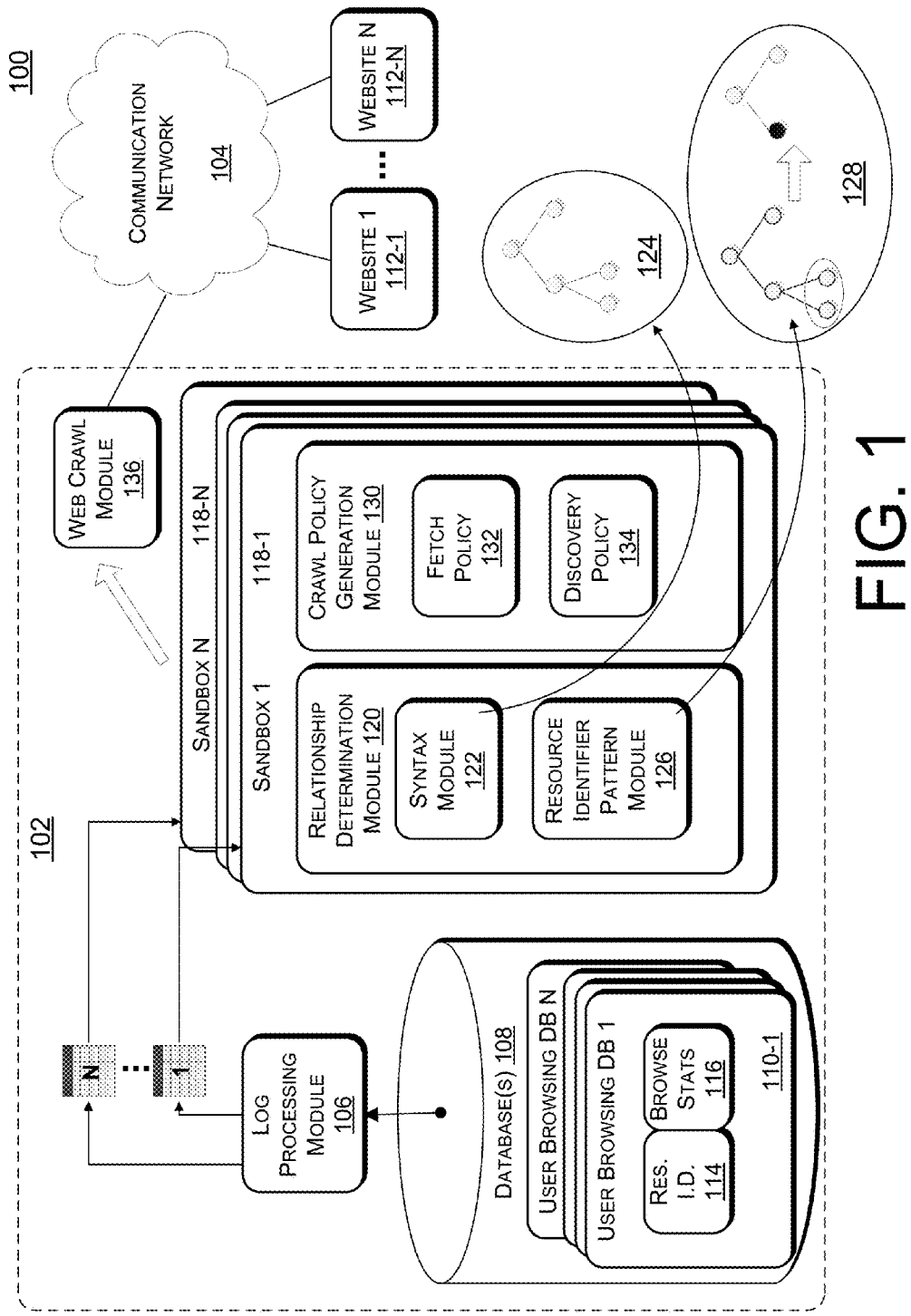
FIG. 1 is a schematic diagram of an example environment usable to develop resource download policies based on resource identifier patterns and user browsing statistics.

As discussed above, the Internet is increasingly dynamic. For example, much modern website content is user-generated, websites are organized with deep link levels, and web pages are created and retired much more rapidly than in the past. Conventional web crawl policies do not handle this dynamism well. This is because conventional policies utilize individual URLs as their basic unit. Thus, they do not easily discover new URLs.

Embodiments of the present disclosure determine information download policies—such as web crawl ordering policies—based on user browsing data. User browsing data includes resource identifiers (such as URLs) associated with resources (such as web pages, media files, and so forth) that have been previously accessed by users. User browsing data also includes user browsing statistics related to the resource identifiers. Such user browsing data includes numbers of site visits and numbers of transits between resources (such as by users clicking on links in web pages), as well as other data types. Embodiments determine relationships between resources within a website based on resource identifier syntax. Once the relationships between resource identifiers are determined, resource identifier patterns are created. These resource identifier patterns are determined based on, for example, resource identifier syntax and user browsing statistics. In one example, the user browsing statistics may be obtained from the user weblogs of users who have agreed to have their browsing behaviors made available.

Aggregated user behavior statistics associated with the resource identifier patterns are used to determine web crawl policies for the website. The web-crawling policies are based on rankings of resource identifier patterns within the website. In embodiments, web crawl policies for the websites are determined in multiple "sandboxes" or instances. These "sandboxes" can be processed in parallel, thus allowing embodiments to determine crawl ordering policies for a large number of websites with relatively low computational cost. In embodiments, computation is distributed across multiple machines to save running time.

Resource download policies based on resource identifier patterns overcome the "sparsity" problem of using individual resource identifiers from user browsing data to build crawl ordering policies. The sparsity problem states that the number of individual resource identifiers within a domain or website can be quite large, but that the user browsing statistics related to each individual resource may be relatively few (i.e., sparse), making computation of a resource download policy based on such individual identifiers computationally complex. Resource identifier patterns according to embodiments, however, can be made relatively small in number, while still covering most resources within a website. Also, the amount of aggregated user browsing statistics for each resource identifier pattern is relatively high. Resource identifier patterns can therefore be used to predict new resource identifiers within a website in a way that is not computationally complex.

Resource identifier patterns are also more stable than individual resource identifiers. Individual resources within a website appear and disappear rapidly, but resource identifier patterns within a website are relatively stable. An example resource identifier pattern may be www.abc.com/corporate/.* which may cover multiple resource identifiers within the domain www.abc.com, such as "www.abc.com/corporate/help.html" and "www.abc.com/corporate/overview.html." The resource identifier pattern ("www.abc.com/corporate/.*") is likely to apply to resources within the website even if the "www.abc.com/corporate/overview.html" and the "www.abc.com/corporate/help.html" resources are deleted and replaced with another resource such as "www.abc.com/corporate/foo.html."

Resource identifier patterns cover most resource identifiers within a website over a long period of time, such as half of a year or more. Moreover, the role and function of resources covered by a resource identifier pattern also remain stable over time. User browsing behaviors associated with individual resources covered by a resource identifier pattern are therefore likely to remain stable over time, even if the individual resource identifiers covered by the resource identifier patterns change frequently. Thus, resource download policies based on resource identifier patterns are capable of discovering new resources within a website even as website resources are created and retired over time.

Example Environment for a Resource Download Policy Generation

FIG. 1 is a schematic diagram of an example environment 100 usable to develop resource download policies based on resource identifiers and user browsing statistics. Resource download policy service 102 may be implemented on various suitable computing device types that are capable of implementing a resource policy download generation service. Suitable computing device or devices may include, or be part of, one or more personal computers, servers, server farms, datacenters, combinations of these, or any other computing device(s) capable of storing and executing all or part of the resource download policy generation service. Communication network 104 may include one or more of the Internet, wide area networks, local area networks, personal area networks, a combination of these, and others, any or all of which may be wired and/or wireless. Resource download policy service 102 may be coupled to communication network 104 using various communication connections and protocols.

In the illustrative example of FIG. 1, log processing module 106 retrieves from database(s) 108 one or more user browsing databases 110. User browsing databases 110 correspond to user browsing data from various websites, such as websites 112. User browsing data includes resource identifiers 114 of resources that have been accessed by one or more users, and browse statistics 116 including user browsing statistics related to resource identifiers 114, such as site visits to the resources and links activated by users. Log processing module 106 may be configured to remove duplicate records, and/or to format the data. Log processing module 106 may also be configured to scrub the user browsing statistics in order to maintain user anonymity.

The processed databases are passed to sandboxes 118, which may be executed as separate instances within resource download policy service 102. Sandboxes 118 are configured to determine web crawl policies for individual websites. For example, sandbox 118-1 is configured to determine a web crawl policy for website 112-1, sandbox 118-N is configured to determine a web crawl policy for website, 112-N, and so forth. Relationship determination module 120 is configured to determine relationships between individual resource identifiers within a website based on resource identifier syntax. In one non-limiting example, the resources may be web pages and the resource identifiers may be URLs. Syntax module 122 is configured to determine relationships between resource identifiers in user browsing database 110-1. As shown in detail 124, the relationship between resource identifiers (such as URLs) can be conceptualized as a pattern tree, with each node representing a syntactical element of the resource identifier syntax scheme of the website. Pattern trees are described in more detail below.

Resource identifier pattern module 126 is configured to determine resource identifier patterns, based for example on syntax and user browsing behavior. As shown in detail 128, lower-level nodes of the pattern tree may be merged to higher-level nodes in order to determine a resource identifier pattern (shown in detail 128 as a solid-black node). Relationship determination module 120 is configured to aggregate user browsing statistics associated with the nodes that have been cut and to associate the aggregated data with the resource identifier pattern.

Crawl policy generation module 130 is configured to generate resource download policies based on the resource identifier patterns and aggregated browse statistics. Such resource download policies identify an order for downloading or retrieving information from a website. For example, fetch policy 132 may be a policy optimized to download as much information as is feasible, given bandwidth and storage constraints, from a website. Fetch policy 132 is based on the resource identifier patterns and the aggregated associated user browsing statistics, such as the numbers of visits to the individual resources represented by the resource identifier patterns, frequency of visits, average numbers of visits, and so on. For example, a resource identifier pattern with many page visits, or with many average visits per page, may be ordered higher up in fetch policy 132.

Discovery policy 134 may be a policy optimized to discover new resources, and new resource identifiers, within a website. The policy may be based on resource identifier patterns and the aggregated user browsing statistics, such as for example the numbers of links activated by users in the resources represented by the resource identifier patterns, average numbers of links, and so on. For example, a resource identifier pattern having many activated links (or transits), may be ordered higher up in discovery policy 134.

Web crawl module 136 is configured to search for, download, and store information about resources on various ones of websites 112 according to various fetch and discovery policies determined for those websites. The information about resources may include the resources themselves, portions of the resources, or other descriptive data such as keywords, media file names, and so forth. Web crawl module 136 is configured to prioritize the search, download, and store resources within websites 112 based on rankings of resource identifier patterns in one or both of fetch policy 132 and discovery policy 134.

Example Resource Download Policy Generation System

Figure 2:
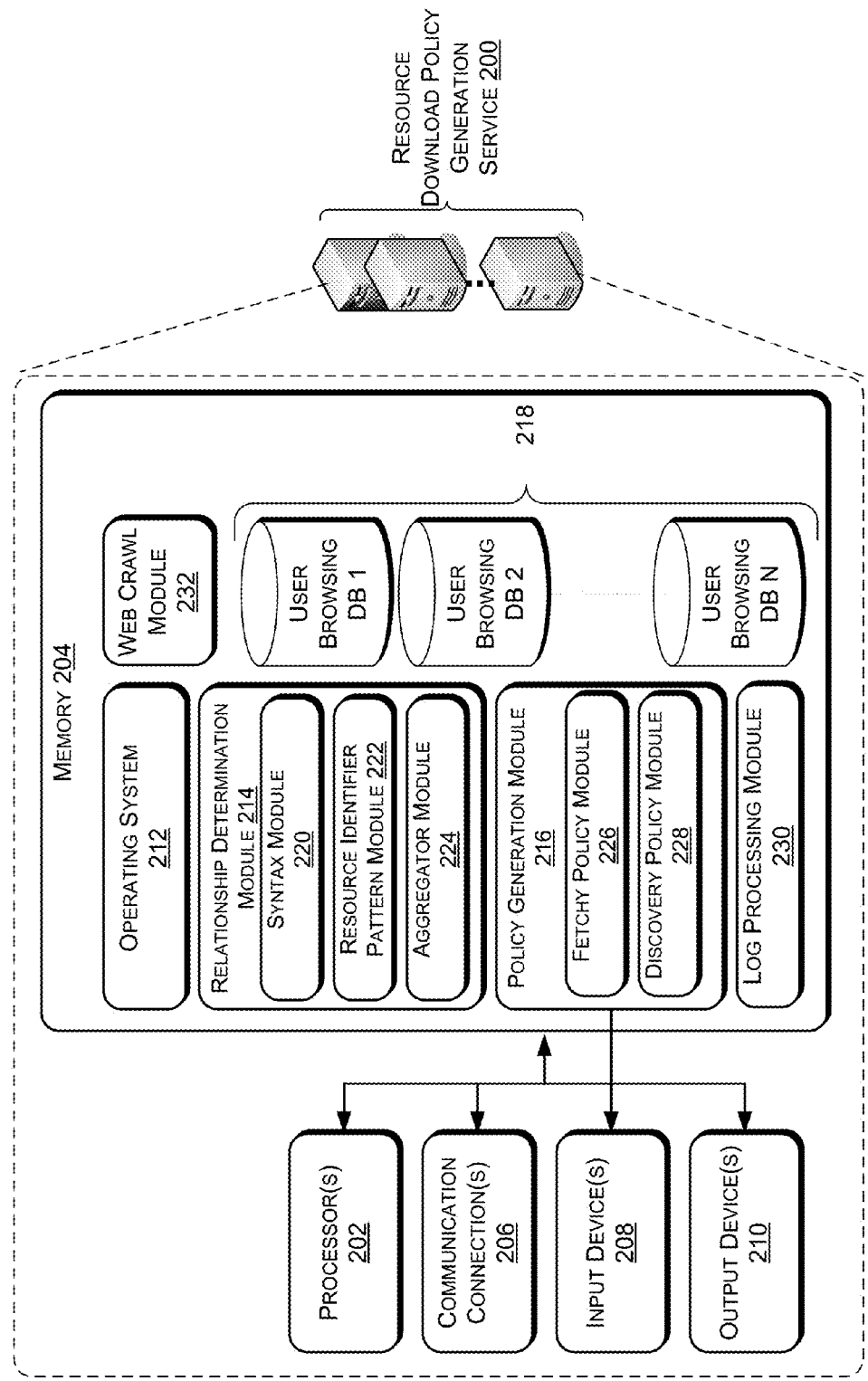
FIG. 2 is a block diagram of an example resource retrieval policy generation service.

FIG. 2 is a block diagram of an example resource download policy generation service, such as resource download policy generation service 102 of FIG. 1. The resource download policy generation service 200 may be configured as any suitable computing device capable of implementing a location provider service. According to various non-limiting examples, suitable computing devices may include personal computers (PCs), servers, server farms, datacenters, combinations of these, or any other computing device(s) capable of storing and executing all or part of the resource download policy generation service.

In one example configuration, the resource download policy generation service 200 comprises one or more processors 202 and memory 204. The resource download policy generation service 200 may also contain communication connection(s) 206 that allow the resource download policy generation service 200 to communicate with various devices such as for example one or more websites. The resource download policy generation service 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

The memory 204 may store program instructions that are loadable and executable on the processor(s) 202, as well as data generated during execution of, and/or usable in conjunction with, these programs. In the illustrated example, memory 204 stores an operating system 212, a relationship determination module 214, a policy generation module 216, and one or more user browsing databases 218. The operating system 212 provides basic system functionality of the resource download policy generation service 200 and, among other things, provides for operation of the other programs and modules of the resource download policy generation service 200.

Relationship determination module 214 also includes syntax module 220 configured to determine relationships between resource identifiers (such as URLs) in user browsing databases 218. These relationships may be determined based on syntactical components of the resource identifiers within a website. Relationship determination module 214 also includes resource identifier pattern module 222 configured to determine the resource identifier relationships based on, for example, syntax as well as user browsing statistics associated with the resource identifiers.

Relationship determination module 214 also includes aggregator module 224 configured to aggregated user browsing statistics, such as those in user browsing databases 218, for the resources associated with a resource identifier pattern. As noted above, such a pattern is likely to remain stable over time and to provide the basis for a web resource download policy that is useful for handling dynamic websites.

Policy generation module 216 includes fetch policy module 226 configured to generate resource download policies for downloading interesting resources of a website (i.e., a "comprehensive fetch" of the website). An "interesting" resource is one that contains information that many users will want to review, or that contain links to other interesting resources. Thus, "interesting resources," as used herein, are those resources that generate a relatively large number of site visits, that generate relatively large number of transits to other resources, or that are reviewed by users for a relatively lengthy period, for example. These and other measures of user interest may be indirect measures, but they serve as a useful proxy for subjective user interest in the context of the present disclosure. A web crawl policy according to embodiments embodies a prediction of those resources that users are likely to find interesting in the future. Embodiments of the present disclosure utilize past user browsing behavior to generate a prediction of those resources that users (either the same or different users) are likely to find interesting in the future.

The purpose of a fetch policy may be to create a crawl ordering for a website in order to take a "snapshot" of the interesting resources within a website at a certain point in time. Fetch policy module 226 utilizes aggregated user browsing statistics associated with the resource identifier patterns, as generated by aggregator module 224, to determine the interesting resources and resource identifiers for one or more fetch policies. Embodiments therefore utilize user browsing statistics in two ways: to create resource identifier patterns and to create ordering policies for those resource identifier patterns.

Policy generation module 216 includes discovery policy module 228 configured to generate resource download policies that are optimized for discovering new interesting resources of the website. Discovery policy module 228 utilizes aggregated user browsing statistics associated with the resource identifier patterns, as generated by aggregator module 224, to determine the interesting resources and resource identifiers for one or more discovery policies.

An "interesting" resource may be defined differently depending on whether a comprehensive fetch or a discovery policy is being generated. Therefore, different types of user browsing statistics may be used when generating these two types of policies. These and other types of policies may utilize still other types of user browsing statistics.

Records in the user browsing databases 218 may be in the form of a triple, such as:

$<URL_{target}, URL_{referrer}, GUID>$

Where $URL_{target}$ is the URL browsed by the user and $URL_{referrer}$ is the URL from which the user arrived at $URL_{target}$ (such as for example by activating a link within $URL_{referrer}$). GUID is a string to identify anonymous users.

Maintaining user anonymity is important. Therefore, embodiments take appropriate steps to ensure that an individual cannot be identified from his or her GUID, or from other records within user browsing databases 218. For example, prior to making user databases 218 available to resource download policy generation service 200, various embodiments scrub user browsing databases 218 of personally identifying information such as names, usernames, passwords, social security numbers, account numbers, postal mailing address information, telephone numbers, and so forth. Such potentially personally identifying information might be included, for example, in various elements of URLs within the data. Furthermore, user browsing databases 218 may be kept in a secure location and protected against unauthorized access using appropriate measures such as encryption and network access controls. User browsing databases 218 may also be routinely purged after resource download policies are created. Moreover, users may be provided with notice that their data is being collected, and information on how their data will be used. Furthermore, users may be allowed to either provide opt-in or opt-out consent. With opt-in consent, the user has to take an affirmative action before the data is collected. With opt-out consent, the user can take an affirmative action to prevent the collection of data before that data is collected.

Duplicate records (i.e., records indicating that the same user transited from $URL_{referrer}$ to $URL_{target}$ multiple times) may be removed to avoid bias brought by individual users. Based on the cleaned log records, policy generation module 216 is configured to define several user browsing statistics that characterize user behaviors associated with URLs within a website:

$\mathcal{F}_{in}(u)$. The frequency of the URL u being a visit target. It is defined as the number of records whose $URL_{target}$ is u.

$\mathcal{F}_{out}(u)$. The frequency of the URL u being a referrer. It is defined as the number of records whose $URL_{referrer}$ is u.

$\mathcal{F}_{trans}(u, v)$. The frequency of transiting from the URL u to v. It is defined as the number of records whose $URL_{target}$ is v and $URL_{referrer}$ is u.

Even though the above examples are given with respect to URLs within a website, other embodiments define similar user browsing statistics to characterize user browsing behaviors associated with other resource identifier types, and for other types of information sources besides websites.

Log processing module 230 may process one or more of user browsing databases 218. Log processing module 230 may be configured to remove duplicate records, and/or to format the data. Log processing module 230 may also be configured to scrub the user browsing statistics of information that may be used to identify one or more users, in order to maintain their anonymity, as is described elsewhere within this Detailed Description.

Web crawl module 232 is configured to search for, download, and store information about resources on various websites according to various fetch and discovery policies determined for those websites. The information about resources may include the resources themselves, portions of the resources, or other descriptive data such as keywords, media file names, and so forth. Web crawl module 232 is configured to prioritize the search, download, and store of resources within websites based on rankings of resource identifiers in one or both of a fetch policy and a discovery policy.

Example Process for Resource Download Policy Generation

Figure 3:
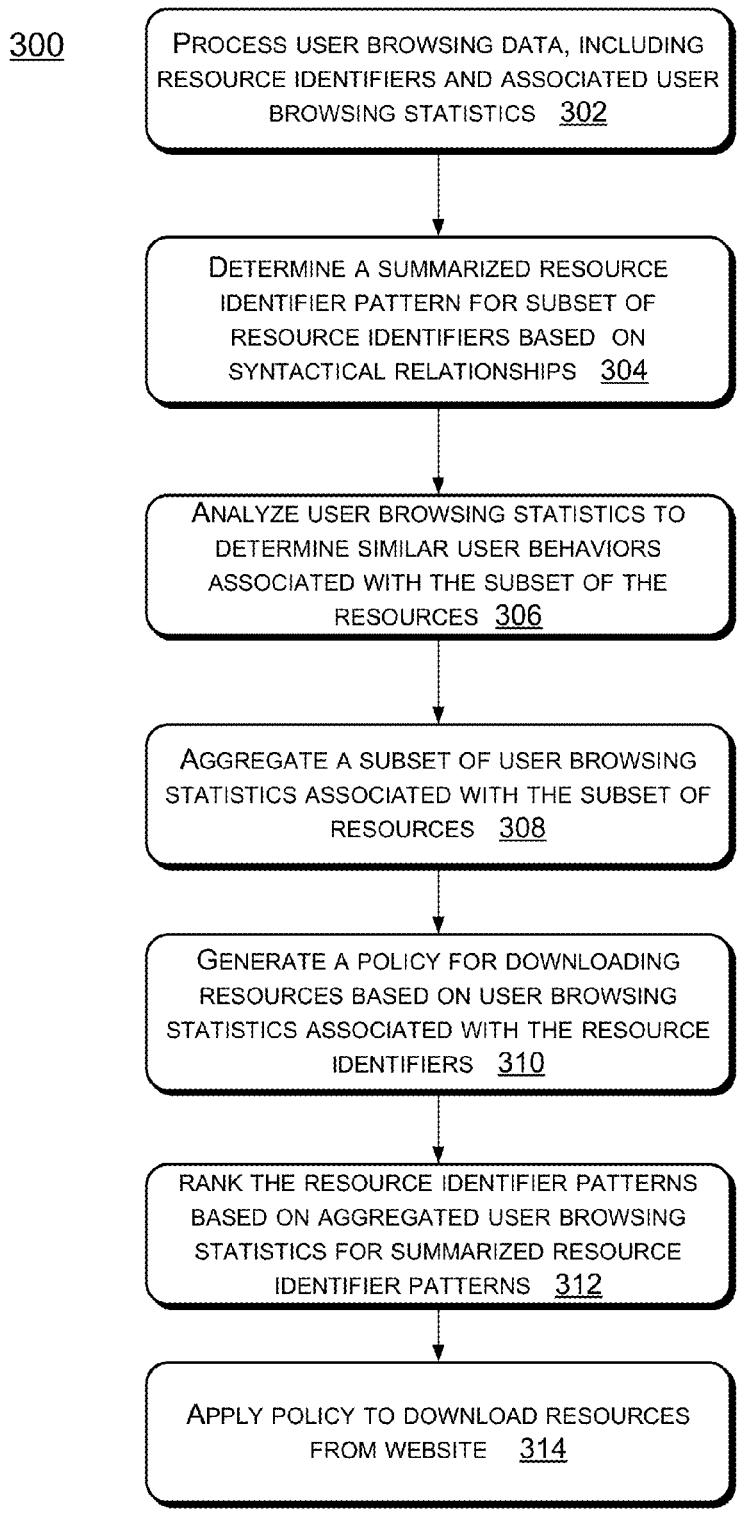
FIG. 3 is a flowchart showing an example process of developing resource download policies based on resource identifier patterns and user browsing statistics.

FIG. 3 is a flowchart showing an illustrative process 300 of developing resource download policies based on resource identifier patterns and user browsing statistics. The method of FIG. 3 may, but need not, be implemented in the environment of FIG. 1 and using the service of FIG. 2.

The methods of FIG. 3 may be implemented by computer-executable instructions. Generally, computer-executable instructions can include routines, programs, objects, components, data structures, procedures, modules, functions, and the like that perform particular functions or that implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods according to various embodiments of the present disclosure. Additionally, individual blocks may be omitted from the method without departing from the spirit and scope of the subject matter described herein. In the context of software, the blocks represent one or more computer instructions that, when executed by one or more processors, perform the recited operations.

Referring back to FIG. 3, processing of user browsing data, including a plurality of resource identifiers and associated user browsing statistics occurs, block 302. Such processing includes, for example, extracting the plurality of resource identifiers of a website and associated user browsing statistics, as well as reformatting and re-associating the data as appropriate. The user browsing data is taken from actual user weblogs, and therefore includes users' actual browsing behavior. Such user browser data may include user search data, but need not include user search data. Such processing may include scrubbing the data of personally identifying information in order to maintain user anonymity. Such processing may additionally or alternatively include removing duplicate records.

Embodiments determine a resource identifier pattern for a subset of a plurality of resource identifiers based at least on syntactical relationships of the plurality of resource identifiers, block 304. The subset of resource identifiers will have at least one syntactical element in common, and in many cases will have more than one syntactical element in common. The subset of resource identifiers may be at the same or different level of hierarchy, and the resource identifier pattern may include the shared syntactical element and represent a level of hierarchy (and level of resource identifier generality) that is higher than the resource identifiers within the subset.

As part of the relationship determination process, embodiments may analyze the user browsing statistics to determine that user behaviors associated with the subset of the plurality of resources are similar, block 306. Thus, the resource identifier pattern may be created for the subset both if the resources are related according to their resource identifier syntax and if the user behavior associated with the resources is sufficiently similar. In embodiments, the user browsing statistics comprise one or more of numbers of visits to the plurality of resources and numbers of referral links of the plurality of resources that were activated by users.

Aggregated user browsing statistics are created by aggregating a subset of the user browsing statistics associated with the subset of the plurality of resources, block 308. As noted above, the resource identifier pattern is created based on resource identifier syntax and user browsing behavior statistics. Thus, the resource identifier pattern is likely to represent resources with similar function and popularity. Thus, the aggregated user browsing statistics associated with the resource identifier pattern represent a plurality of resources within the website—some of which may not exist at the time that the user browsing statistics were collected—with common functions and popularity. This means, among other things, that embodiments can predict that a resource is an "interesting" resource even if its associated resource identifier does not appear in user browsing data used to create the policy.

Embodiments also generate a policy for downloading one or more of the plurality of resources that are identified by the resource identifier pattern based at least on user browsing statistics associated with the plurality of resource identifiers, block 310. Such policies may include comprehensive fetch policies and discovery policies, as are described elsewhere within this Detailed Description.

Embodiments determine multiple resource identifier patterns for multiple subsets resulting in a behavior graph as described elsewhere within this Detailed Description. Generating a policy for downloading one or more resources of the plurality of resources includes ranking the plurality of resource identifier patterns based at least on aggregated user browsing statistics for the plurality of resource identifier patterns, block 312.

The policy is applied by a web crawling module to download resources from the website, block 314. The web crawling module utilizes the resource identifier patterns, according to their relative rankings as determined in the policy, to download one or more resources associated with the resource identifier patterns, and to search for new resources that were not included in the user browsing data used to construct the policy. Such new resources have new resource identifiers that match the resource identifier pattern at a certain level of hierarchy and generality.

Example Resource Identifier Decomposition and Relationship Determination

Resource identifier patterns are determined in two ways: by determining relationships between the resources in a website, and by identifying related resources with similar associated user browsing statistics. Resource identifier syntax is used to determine the relationships between resources. Thus, embodiments determine the relatedness of web pages within a website based on a decomposition of resource identifier syntax. Resource identifier syntax is based on a naming convention or scheme for individual resources within a given website. This naming scheme tends to be hierarchical in nature.

For example, a hypothetical website might have pages with the following URLs:
   http://www.abc.com/corporate/clients
   http://www.abc.com/corporate/employees These URLs both include "www.abc.com" and "corporate" within their URL syntax. The syntactical element "www.abc.com" is at a higher level of hierarchy (and therefore has a higher level of generality) than is the syntactical element "corporate." The elements "clients" and "employees" are at the same level of hierarchy as each other, and are at a lower level of hierarchy than "corporate."

The more syntactical elements shared between identifiers of two pages within a website, the more likely it is that those two pages have similar functions within the website, and the more likely it is that those two pages include related content. The relatedness of the two web pages can therefore be determined based on how similar their URL syntaxes are. Stated another way, URL syntactical similarity can serve as a proxy for webpage relatedness. Furthermore, because URL naming schemes tend to be hierarchical, the relatedness in page contents can be determined based on how many higher-level syntactical elements the URLs share. Therefore, in embodiments of the present disclosure, individual web page URLs are decomposed into their various syntactical elements, and the hierarchical relationships between the URLs are determined.

Figures 4A, 4B:
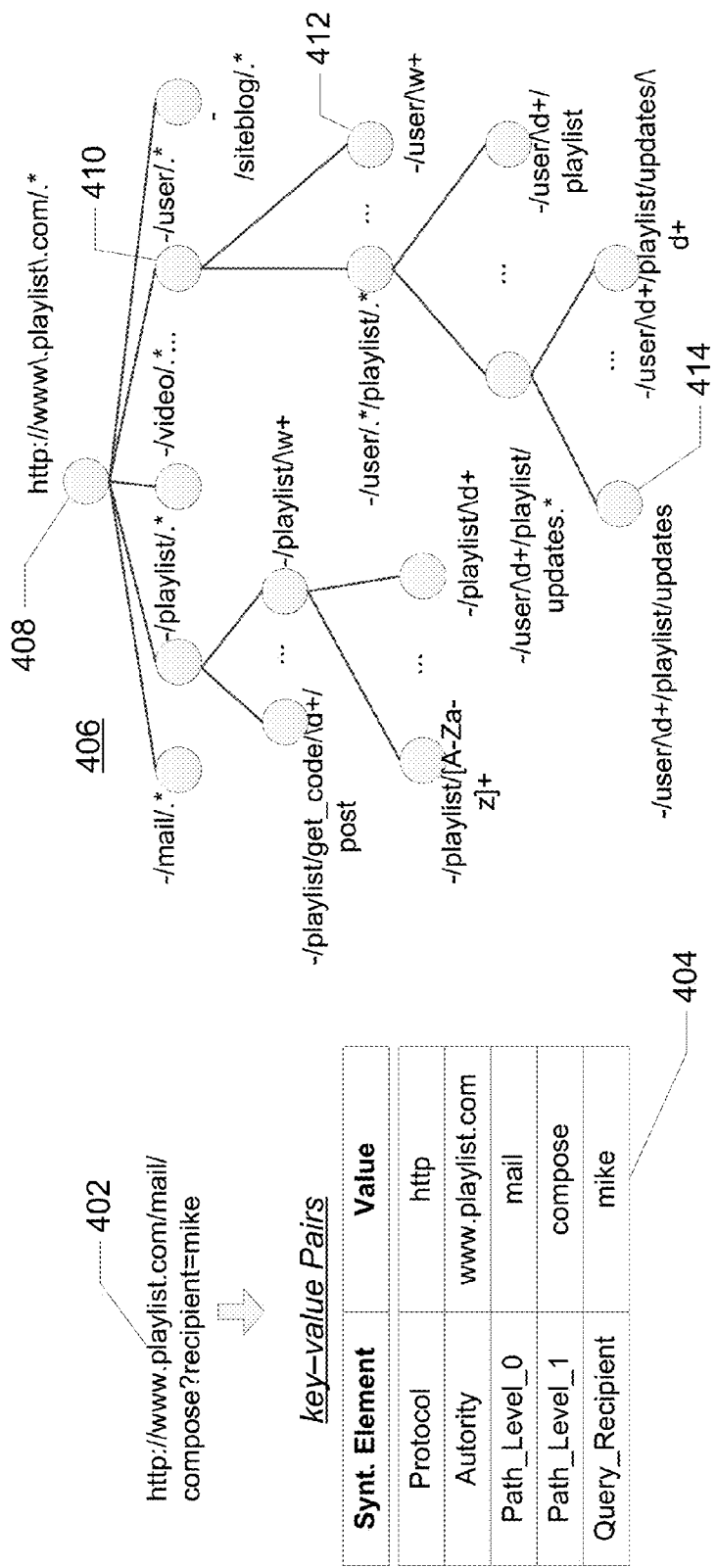
FIG. 4A is a table showing example syntactical decomposition of a resource identifier.
FIG. 4B illustrates an example pattern tree and hierarchical relationships between resources based on their syntactical elements.

FIG. 4A is a table showing the syntactical decomposition of a resource identifier. Resource identifier 402 is a URL that identifies a particular resource within a website (in this example the website is www.playlist.com). A URL, such as resource identifier 402, is a text string that can be decomposed into a series of syntactical elements. A URL string can be described as a series of "key-value" pairs, in which each key corresponds to a syntactical element, as shown in table 404. URLs within a website usually follow a syntactical scheme designed by the website designers. Different URL components (i.e., syntactical elements) have different associated functions and play different roles, e.g., some syntactical elements denote directories, others include browsing parameters, and so forth.

FIG. 4B illustrates a pattern tree and the hierarchical relationships between resource identifiers based on their syntactical elements. Pattern tree 406 is shown in a top-down manner, with a top node 408 representing a root syntactical element of the website at the highest level of hierarchy according to the syntactical scheme of the website. All resources within the website have resource identifiers that include the syntactical elements of top node 408. At a lower level of hierarchy (i.e., at a lower level of generality) than the top node 408, the nodes represent various resource identifiers having additional syntactical elements. An example is node 410 which includes the additional syntactical element "user." At still lower levels, some but not all resource identifiers within the website—such as those represented by nodes 412 and 414—fall under a node having the "user" syntactical element.

Embodiments determine the relationships between the resource identifiers in the website by constructing a pattern tree, such as pattern tree 406. Embodiments begin at a root, such as at top node 408, and iteratively split the corresponding resource identifiers into subgroups according to their values under a particular syntactical element. Various nodes within pattern tree 406 have parent child relationships. For example, node 410 is a child of top node 408. Node 410 is also a parent node to node 412, and so forth. The iterative splitting occurs until the bottom nodes represent individual resource identifiers of the website.

In the illustrative example shown in FIG. 4B, the terminal nodes (those nodes having no children), may represent the complete resource identifiers of actual resources within the website. Intermediate and top nodes—such as nodes 410 and 408—sometimes may, and sometimes may not—represent the complete resource identifiers of actual resources within the website.

As shown in FIG. 4B, the hierarchical relationships between URLs (or other resource identifier types) can be visualized as a pattern tree, with nodes on the tree representing a URL pattern at a certain level of granularity (i.e., at a certain level of hierarchy). A child node has a URL that shares higher-level URL syntax with its parent node, but the child node has a lower degree of URL generality than does its parent node (and will therefore have at least one syntactical element that its parent does not). Embodiments may construct data representations of the relationships between URLs, and these data representations may be conceptualized or visualized as pattern trees. While various embodiments described within this Detailed Description may make reference to pattern trees, pattern trees are not the only way to conceptualize or visualize the relationships between URLs within a website, and reference to "pattern trees" within this disclosure is not meant to limit the scope of this disclosure. Embodiments do not necessarily render representations of pattern trees on a display device, although they may. Pattern trees are described herein merely for the purpose of illustration.

Example Resource Identifier Pattern Determination

Pattern tree 406 in FIG. 4B is an example of determining relationships between resource identifiers based on resource identifier syntax. In addition to determining the relationships between resources based on their resource identifier syntax—such as is described in FIGS. 4A and 4B—embodiments also determine resource identifier patterns based on the relationships between resource identifiers and user browsing statistics. To do so, related resource identifiers with similar syntax may be grouped or merged together based on a determination that the user behaviors with respect to those resource identifiers are similar. When resource identifiers at similar levels of syntactical hierarchy are merged based on user behavior statistics, the resulting resource identifier patterns are stable and are likely to represent resources with related content.

In an illustrative example, the URLs:
http://www.abc.com/corporate/clients; and
http://www.abc.com/corporate/employees
may be merged into a single URL pattern:
http://www.abc.com/corporate/.*

Figure 5:
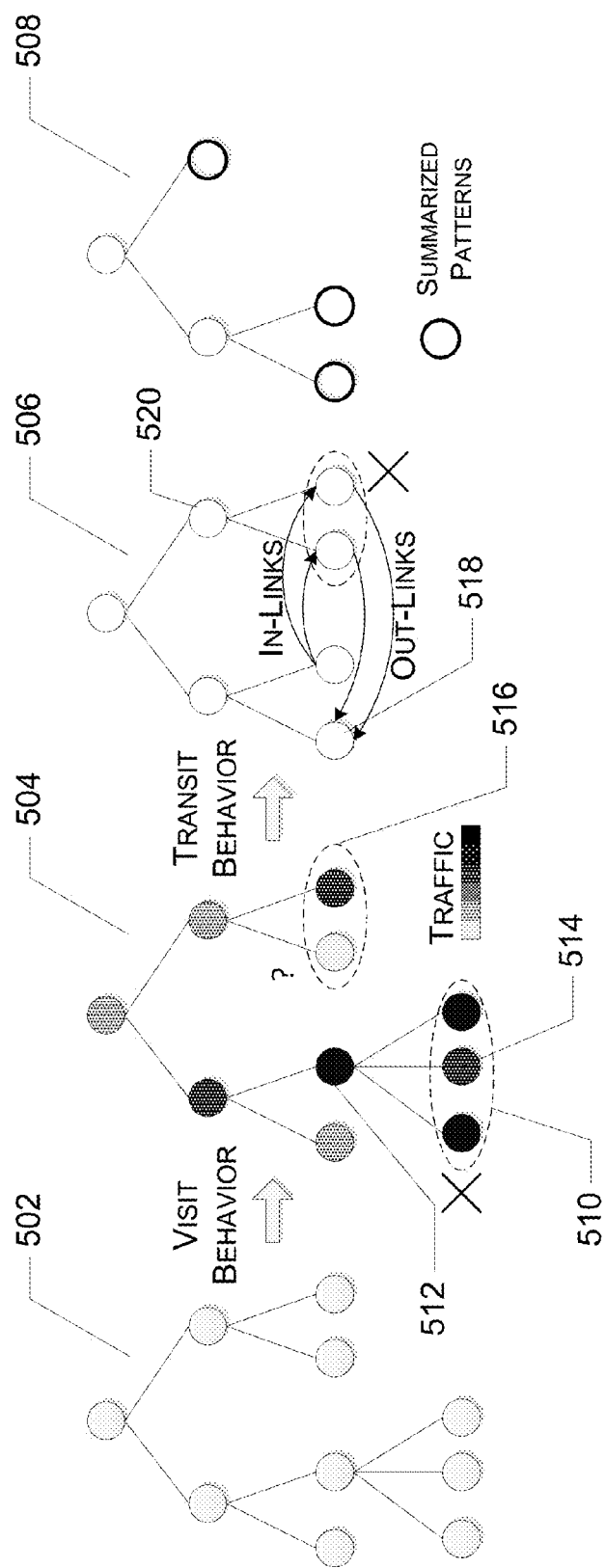
FIG. 5 illustrates an example pattern tree of resource identifier patterns constructed based on user browsing statistics.

FIG. 5 illustrates a pattern tree and resource identifier determination based on user browsing statistics. Pattern tree 502 represents relationships between resource identifiers (such as URLs) within a website. Pattern tree 502 in FIG. 5 may be analogous to pattern tree 406 in FIG. 4B. The nodes on pattern tree 502 may be merged into their parent nodes in order to generate resource identifier patterns. Determining which nodes to merge is based on user browsing statistics. There are at least two general types of user browsing statistics: those related to site visits and those related to transits between resources (such as transits initiated by user clicks on web page links). The two types of user browsing statistics may be considered in order to tailor syntax-based pattern tree 502 as shown in FIG. 5. FIG. 5 illustrates a progression of pattern tree 502 to pattern tree 504 as nodes are merged based on site visits. FIG. 5 also illustrates the progression from pattern 504 to pattern tree 506 as nodes are merged based on transit behavior. A final version of the pattern tree, pattern tree 508, includes the summarized resource identifier patterns (denoted by the thick circle nodes) after all nodes have been merged based on resource identifier syntax and user browsing behavior.

Nodes of pattern tree 504 are shown shaded according to the number of site visits that the corresponding resources received according to user browsing statistics. The darker shading indicates a high volume or frequency of traffic to a resource, and lighter shading indicates a lower volume or frequency of user traffic to a resource. If related nodes at the same level of hierarchy within the pattern tree have similar site visit frequencies, then the nodes can be merged into their parent node. For example, the three nodes in dashed ellipse 510 can be removed from pattern tree 504 because their aggregated user site visit statistics are sufficiently similar to allow a resource identifier pattern—represented as node 512—to adequately represent each of these nodes (and the resource identifiers that they represent) in a resource identifier pattern.

Two factors are considered in making this determination. It is desirable for the aggregated user browsing statistics to approximate the distribution of visit traffic to the resources represented by the nodes that are cut. In addition, it is desirable to cut nodes that have relatively subtle differences in their traffic in order to remove redundancy. Thus, node 514 has slightly less visit traffic than do its neighbors under node 512. In the illustrative example, the visit traffic for node 514 is sufficiently similar to other nodes in dashed ellipse 510 that node 514 can be cut, along with its neighbor nodes, in order to remove redundancy from the pattern tree.

Pattern tree cutting is analogous to using a model (i.e., a cut plan) to characterize a dataset (such as visit traffic to URLs). A model with lower complexity (i.e., a pattern tree having fewer nodes) is desirable if it can sufficiently describe the user browsing behavior. Embodiments utilize the minimum description length (MDL) principle to balance the model complexity with the data fit when performing resource identifier pattern determination (e.g., a tree cut). The following table illustrates various pattern-level statistics of browsing behaviors that will be referenced in the following description of the MDL principle.

| | |
|---|---|
| $\|\mathbb{P}\|$ | The number of unique URLs in the pattern $\mathbb{P}$ |
| $\mathcal{F}_{in}(\mathbb{P})$ | The frequency of user visiting URLs in the pattern $\mathbb{P}$. $\mathcal{F}_{in}(\mathbb{P}) = \Sigma_{u \in \mathbb{P}} \mathcal{F}_{in}(u)$ |
| $\mathcal{F}_{out}(\mathbb{P})$ | The frequency of user taking URLs in the pattern $\mathbb{P}$ as referrers. $\mathcal{F}_{out}(\mathbb{P}) = \Sigma_{u \in \mathbb{P}} \mathcal{F}_{out}(u)$ |
| $\mathcal{F}_{trans}(\mathbb{P}_a, \mathbb{P}_b)$ | The frequency of user transiting from a URL in $\mathbb{P}_a$ to another in $\mathbb{P}_b$. $\mathcal{F}_{trans}(\mathbb{P}_a, \mathbb{P}_b) = \Sigma_{u \in \mathbb{P}_a, v \in \mathbb{P}_b} \mathcal{F}_{trans}(u, v)$ |

Let $\mathbb{U}$ be a set of URLs (or other resource identifiers) used to construct a pattern tree, such as pattern tree 504. A tree cut plan is denoted by a set $\Gamma = \{\mathbb{P}_1, \ldots, \mathbb{P}_K\}$ in which each $\mathbb{P}_k$ ($1 \leq k \leq K$) is a leaf node kept after the cut. According to the MDL principle, the best tree cut $\Gamma_{best}$ is the one that minimizes the sum of the model description length $L(\Gamma)$ and the data description length $L(\mathbb{U}|\Gamma)$ under the model $\Gamma$, as:

$$\Gamma_{best} = \mathrm{argmin}_\Gamma (L(\mathbb{U}|\Gamma) + L(\Gamma)) \quad (1)$$

The model description length can be estimated by:

$$L(\Gamma) = \frac{K-1}{2} \log \mathcal{F}_{in}(\mathrm{P}_{root}) \quad (2)$$

where $\mathcal{F}_{in}(\mathbb{P}_{root}) = \Sigma_{u \in \mathbb{U}} \mathcal{F}_{in}(u)$ is the total visit traffic on all the URLs in $\mathbb{U}$; and K is the number of patterns in $\Gamma$. And the data description length can be described by the negative log likelihoods of the data given the model:

$$L(\mathbb{U}|\Gamma) = -\log p(\mathbb{U}|\Gamma) = -\Sigma_{u \in \mathbb{U}} \log p(u|\Gamma). \quad (3)$$

Here the probability of a URL u ($u \in \mathbb{P}_k$) being visited is defined by averaging the pattern-level probability $\mathbb{P}_{in}$ ($\mathcal{F}_k$)/$\mathcal{F}_{in}(\mathbb{P}_{root})$ with the pattern volume $\|\mathbb{P}_k\|$:

$$p(u|\Gamma) = \frac{1}{\|\mathrm{P}_k\|} \frac{\mathcal{F}_{in}(\mathrm{P}_k)}{\mathcal{F}_{in}(\mathrm{P}_{root})}, \; s.t., u \in \mathrm{P}_k, \mathrm{P}_k \in \Gamma \quad (4)$$

In other words, the visit probability of a single URL is smoothed by the averaged visit probability of the URL pattern that it belongs to.

Following a dynamic programming-based algorithm, the MDL-based tree cut can be efficiently solved with a time complexity $O(K_0 \times \|\mathbb{U}\|)$ where $K_0$ is the number of leaf nodes of the original syntax-based pattern tree.

FIG. 5 illustrates pattern tree 506 after it has been cut based on site visits, as is described above. A determination of resource identifier patterns based on statistics related to site transits, or links between resources (such as web pages) that have been activated by users, will now be described with reference to pattern tree 506. Sometimes children nodes under a single parent node have relatively variant popularities (i.e., their site visit statistics are not similar) even though they have similar functions within the website. Because their site visit statistics are not similar, they are not cut based on site visit traffic as is described above. Example nodes that are not cut for this reason are the nodes in dashed ellipse 516 (shown as having very different site visit statistics).

But embodiments also utilize site transit data to determine whether nodes in a pattern tree should be cut. In an illustrative example, if the two nodes in dashed ellipse 516 have the same in-links and out-links, embodiments may merge them even if their site visit statistics are not very similar. Transit behavior may be more stable than visit traffic since it is often restricted by the hyperlinks in a website.

The illustrative example of resource identifier pattern determination shown in FIG. 5 show site visit statistics being used for a first cut (pattern tree 504) and transit statistics being used for a second cut (pattern tree 506). But embodiments are not limited to making site visit-based cuts first; nor are they limited to considering transit and site visit statistics separately. It may be advantageous in certain circumstances to make transit-based cuts second. First, it can be computationally difficult to measure the similarity of transit relationships based on individual resource identifiers since such transits are often from a relatively sparse data pool. Second, the computational cost of working with transit traffic for a large number of resource identifiers can be high, since the number of candidate links to be measured can be quite large. Making a site visit-based cut decreases the number of nodes, and eliminates some patterns, and therefore makes transit-based calculations less computationally complex.

Given a pattern $\mathbb{P}_k$, the in-link and out-link distributions based on the transit frequency $\mathcal{F}_{trans}$ can be characterized as:

$$p_i^{in} = [p_{1 \to i}^{in}, \ldots, p_{k \to i}^{in}, \ldots, p_{K \to i}^{in}], \quad p_{k \to i}^{in} = \frac{\mathcal{F}_{trans}(\mathbb{P}_k, \mathbb{P}_i)}{\mathcal{F}_{in}(\mathbb{P}_i)} \quad (5)$$

$$p_i^{out} = [p_{i \to 1}^{out}, \ldots, p_{i \to k}^{out}, \ldots, p_{i \to K}^{out}], \quad p_{i \to k}^{out} = \frac{\mathcal{F}_{trans}(\mathbb{P}_i, \mathbb{P}_k)}{\mathcal{F}_{out}(\mathbb{P}_i)}$$

In this illustrative example, the two nodes from dashed ellipse 516 have the same in-link node and out-link node (node 518). Thus, the nodes in dashed ellipse 516 can be cut and merged into node 520. And their aggregated user browsing statistics can be associated with node 520. Pattern tree 508 is a final version of the pattern tree after both cuts have been made. The summarized patterns (parent nodes having merged child nodes) are shown as thick-circle nodes.

Example Resource Identifier Determination Including Transit Propagation

Figure 6B:
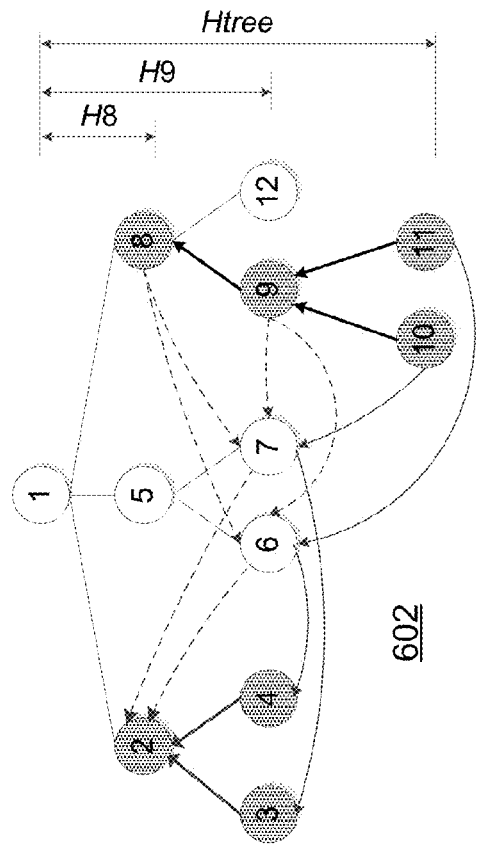
FIGS. 6A and 6B illustrate pattern trees of resource identifier patterns constructed based on user transits between resources, including propagation of transit behavior to higher-level nodes on the pattern trees.
Figure 6A:
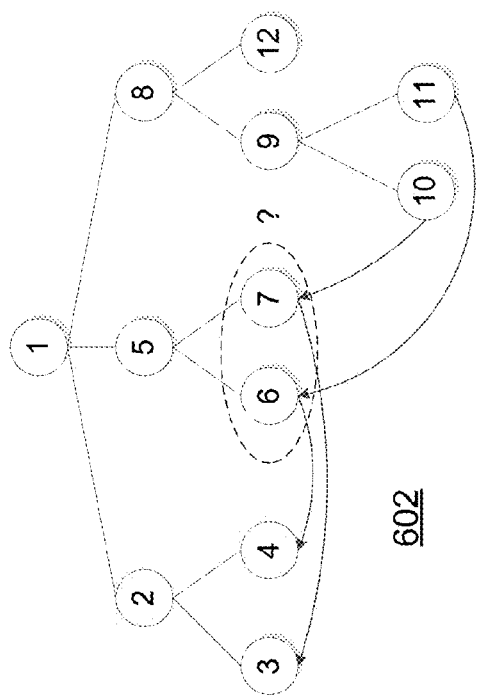

FIGS. 6A and 6B illustrate a pattern tree and resource identifier pattern determination based on user transits between resources, including propagation of transit behavior to higher-level nodes on the pattern tree. The illustrative example shown in FIG. 5 is a relatively simple one. An approach to handle more complex transit behavior is illustrated in FIGS. 6A and 6B.

Pattern tree 602 includes nodes 1-12. Nodes 6 and 7 have different in-link nodes and out-link nodes, and their cosine similarities are both zeros according to equation (5), indicating that nodes 6 and 7 are not candidates for cut and merge. However, their in-link nodes (nodes 10 and 11) and out-link nodes (nodes 3 and 4) are related based on their syntax. Nodes 6 and 7 have similar transit relationships if node 9 and node 2 are treated as their in-link and out-link nodes, respectively.

To avoid the sparsity problem—where a small number of transits from a large number of resource identifiers results in a computationally complex transit-based tree cut—and to smooth the in-link and out-link distributions of pattern tree 602, embodiments propagate transits up to higher levels of the tree, as shown in FIG. 6B. After the propagation, both nodes 6 and 7 have in-links from nodes 8 and 9 and out-links from node 2, meaning that nodes 6 and 7 now have a non-zero in-link similarity according to equation (5), indicating that nodes 6 and 7 can be merged into their parent and cut from pattern tree 602.

The propagation is formally defined by a K×N matrix P whose element $P_{k,n}$ is defined as:

$$P_{k,n} = \begin{cases} \prod_{h=H_n}^{H_k - 1} \frac{h}{H_{tree}} & \text{Node } k \text{ is a leaf node \&} \\ & \text{Node } m \text{ is its ancestor} \\ 1 & k = m \\ 0 & \text{otherwise} \end{cases} \quad (6)$$

where k is a leaf node and m is its ancestor node; k=m otherwise. Also, $H_k$ and $H_n$ are the heights of the node k and n on the tree; $H_{tree}$ is the height of the whole tree; K is the leaf node number (same with the one in equation (5)) and N is the total number of nodes on the tree.

Equation (6) is defined according to the following criteria:
1. The transit relationship of a leaf (child) node can only be propagated to its direct ancestors. This is because a resource identifier associated with a leaf node matches the syntax of its ancestor nodes. Propagation to uncles (e.g. from node 10 to 12 in FIG. 6B) is forbidden as the uncle's resource identifier syntax cannot cover the leaf node's resource identifier syntax.
2. The transit relationship of a leaf node weakens the higher it is propagated up pattern tree 602. Otherwise, most nodes would have strong transit relationships with high-level nodes on pattern tree 602. This would hurt the ability of the original transit data to distinguish between nodes in pattern tree 602. Moreover, the degree of weakening is inversely related to the node depth. That is to say, propagating transit relationships weakens the transit relationship less in a deep level than in a shallower level. Propagating a transit relationship is risky when propagation goes nearly to the tree root (the top node). The decay factor from a child to its father may in embodiments be set as $$\frac{H_{father}}{H_{tree}},$$

where $H_{father}$ is the depth of the father node. And the decay factors are multiplied in sequence when the propagation goes to high-level ancestors.

With the propagation matrix P, the K-dimensional sparse vectors in equation (5) are converted to N-dimensional dense ones:

$$\hat{p}_i^{in} = p_i^{in} \times P; \hat{p}_i^{out} = p_i^{out} \times P \quad (7)$$

And the transit similarity $sim_{transit}(i, j)$ between two leaf nodes $\mathbb{P}_i$ and $\mathbb{P}_j$ is defined as the average of their in-link and out-link cosine similarities on the smoothed N-dimensional vectors, as:

$$sim_{trsnsit}(i, j) = \frac{1}{2}[\cos(\hat{p}_i^{in}, \hat{p}_j^{in}) + \cos(\hat{p}_i^{out}, \hat{p}_j^{out})] \quad (8)$$

Based on equation (8), the consistency of a set of nodes on user transit behavior can be measured using the minimum of the pair-wise transit similarities between any two nodes in that set. For tree cut, it makes sense to remove a node's children if their consistency is good enough. The tailor process is carried out iteratively in a bottom-up way, as the pseudo codes shown in the following Algorithm.

Example Transit-Based Tree Cut Algorithm

The input is a pattern tree and the output is a series of URL patterns.

Let $Q$ be a priority queue in which tree nodes are sorted in descending order according to their depths on the tree.

Initialization of $Q$. For each tree node, add it to $Q$ if the node itself is not a leaf but all its children are leaves.

```
while Q is not empty
    Pop the first node q from Q. C_q is the set of q's children nodes.
    ξ_q = min {sim_transit(m, n), ∀ m, n ∈ C_q & m ≠ n}
    if ξ_q > ξ_thresh-to-cut
        Turn q into a leaf by cutting all the nodes in C_q from the tree.
        Update p_i^in, p_i^out and P following the equations (5) and (6).
        if all the sibling nodes of q are leaves
            Add q's parent node to Q.
        end if
    end if
end while
return URL patterns of all the remaining leaf nodes.
```

Example Approach for Handling Dynamic Websites

Conventional web crawling policies do not always handle the dynamism of modern websites very well. For example, link-based crawling policies tend to work best with static websites that have few link levels. Link-based approaches are therefore less useful for forming web crawling policies in today's dynamic web. In addition, because individual resource identifiers are now created and retired at a relatively fast rate, web crawling policies that use individual web page resource identifiers as their basic unit are not well-suited for discovering new resource identifiers. And a web page with content that a user finds interesting today could be retired or changed tomorrow, thereby potentially rendering obsolete an optimized website-specific crawling policy based on individual web page URL data. But URLs at a higher level of generality—such as URL patterns according to embodiments—remain relatively stable over time, even for dynamic websites. Therefore, aggregated user browsing statistics related to URL patterns, such as those shown in FIG. 4D and pattern tree 508 in FIG. 5, are reliable indicators of user behavior within a website over time. This is one way in which embodiments are able to utilize user browsing data to form effective web crawling policies for dynamic websites.

Example Resource Download Policy Generation

In addition to utilizing user browsing statistics to determine resource identifier patterns, embodiments also utilize aggregated user browsing statistics to formulate crawl policies for a website. Resource download policies according to various embodiments fall under at least two categories: comprehensive fetch and new discovery. Under comprehensive fetch, the purpose is to fetch the interesting information from a website in accordance with download and storage constraints. Under new discovery, the purpose is to discover new resource identifiers within a website. The definition of "interesting" may be different for these two approaches.

For example, in comprehensive fetch, the definition of "interesting" is among other things the relative value of the content in a web page or resource. In timely discovery, the definition of "interesting" is among other things the relative value of the links inside a web page or resource. In both approaches—as well as in other approaches not mentioned herein—user browsing statistics can be used to identify interesting resource identifier patterns. Once the interesting resource identifier patterns are identified based on the user browsing statistics, a web crawling policy for a specific website can be determined.

Various Ranking-for-fetch strategies according to embodiments include Rank-by-Volume, Rank-by-Overall-Visit, and Rank-by-Average-Visit. In Rank-by-Volume, resource identifier patterns are sorted in descending order based on volume $\|\mathbb{P}\|$. Under this strategy, a large volume means that a resource identifier pattern is a dominant resource in a website, and that it is more likely to provide interesting information to users. In Rank-by-Overall-Visit, resource identifier patterns that attract more overall user visit traffic, i.e., $\mathcal{F}_{in}(\mathbb{P})$, are given higher priorities in crawl ordering. In Rank-by-Average-Visit, resource identifier patterns are ordered according to the averaged visit frequency $\mathcal{F}_{in}(\mathbb{P})/\|\mathbb{P}\|$.

Various Ranking-for-discovery strategies according to embodiments include Rank-by-Overall-Referral and Rank-by-Average-Referral. In Rank-by-Overall-Referral, the importance of a resource identifier pattern is evaluated based on the total amount of times that its associated resource identifiers act as referrers in the browse logs, i.e., $\mathcal{F}_{out}(\mathbb{P})$. In Rank-by-Average-Referral, resource identifier patterns are ranked based on the average frequency that their associated resource identifiers play a referrer role in browsing, i.e., $\mathcal{F}_{out}(\mathbb{P})/\|\mathbb{P}\|$.

Embodiments also include other strategies that combine multiple behavior statistics, and that utilize the relationships between different resource identifier patterns. One such strategy is the PageRank algorithm; in this algorithm, page importance spreads through hyperlinks and finally reaches a stable status. The PageRank algorithm therefore estimates the page importance from a global perspective.

Embodiments utilize a behavior graph to determine resource download policies. Each node in a behavior graph is a resource identifier pattern. Behavior graphs differ from link-graphs (utilized by conventional web crawl ordering policies) in various ways. Compared to link-graphs, behavior graphs are relatively small and the related computation is therefore more efficient than with link-graphs. The initialization status of a behavior graph is determined by user browsing statistics at the pattern level; initialization of a link-graph is random. And the transition probabilities (i.e., weights of graph edges) on the behavior graph are also based on user behavior; while the edge weights of link graphs are simply based on physical hyperlinks (e.g., the indegree and outdegree of a page).

The PageRank algorithm noted above measures the overall importance of a graph node and thus is suitable for comprehensive fetch. Another algorithm, Hyperlink-Induced Topic Search (HITS) is suitable for both comprehensive fetch and discovery. The HITS algorithm measures page importance from two aspects—authority and hub. For each graph node, the authority score depicts the value of its content and the hub score describes the value of its links to other nodes. Therefore, embodiments utilize the HITS algorithm to estimate these two importance scores for each node on the behavior graph.

According to the HITS algorithm, the two scores of a node $\mathbb{P}_i$ are initialized based on the user browsing statistics (such as in the table above), as:

$$\operatorname{auth}^0(\mathbb{P}_i) = \frac{\mathcal{F}_{in}(\mathbb{P}_i)}{\mathcal{F}_{in}(\mathbb{P}_{root})}, \operatorname{hub}^0(\mathbb{P}_i) = \frac{\mathcal{F}_{out}(\mathbb{P}_i)}{\mathcal{F}_{out}(\mathbb{P}_{root})} \quad (9)$$

These two initial values are percentages of users taking the resource identifiers in that resource identifier pattern as browsing targets and referrers, respectively. The two scores are continually updated in a series of iterations. The updating formulas of the $k^{th}$ iteration are:

$$\operatorname{auth}^k(\mathbb{P}_i) = \Sigma_j p_{j \to i}^{out} \times \operatorname{hub}^{k-1}(\mathbb{P}_j)$$

$$\operatorname{hub}^k(\mathbb{P}_i) = \Sigma_j p_{i \to j}^{in} \times \operatorname{auth}^{k-1}(\mathbb{P}_j) \quad (10)$$

Where $p_{j \to i}^{out}$ and $p_{i \to j}^{in}$ are the same as is defined in equation (5) above. Both $\operatorname{auth}^k(\mathbb{P}_i)$ and $\operatorname{hub}^k(\mathbb{P}_i)$ are normalized to unit magnitude after the updates.

After the iteration converges, the authority and hub values of each graph node can properly estimate the possibilities of resource identifiers in that resource identifier pattern to be a target or a referrer when users browse the website. Consequently, under the comprehensive fetch scenario, resource identifier patterns are ranked in descending order based on $0.5 \times [\operatorname{auth}(\mathbb{P}_i) + \operatorname{hub}(\mathbb{P}_i)]$; and under the timely discovery scenario, resource identifier patterns are ordered by $\operatorname{hub}(\mathbb{P}_i)$.

Computer-Readable Media

Depending on the configuration and type of computing device used, memory 204 of the resource download policy generation service 200 in FIG. 2 may include volatile memory (such as random access memory (RAM)) and/or non-volatile memory (such as read-only memory (ROM), flash memory, etc.). Memory 204 may also include additional removable storage and/or non-removable storage including, but not limited to, flash memory, magnetic storage, optical storage, and/or tape storage that may provide non-volatile storage of computer readable instructions, data structures, program modules, and other data for the resource download policy generation service 200.

Memory 204 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language specific to structural features and/or methodological acts, the invention is not limited to the specific features or acts described. Rather, the specific features and acts are disclosed as illustrative forms of implementing the invention.

What is claimed is:

1. A computer-implemented method, comprising:
    under control of one or more processors configured with executable instructions:
        determining a resource identifier pattern that identifies a subset of a plurality of resource identifiers of a website, the resource identifier pattern having a higher level of generality than the subset of the plurality of resource identifiers, the determining comprising:
            analyzing the plurality of resource identifiers to determine syntactical relationships between individual resource identifiers of the plurality of resource identifiers;
            determining that at least a first resource identifier of the subset of the plurality of resource identifiers represents an individual resource identifier having a lower syntactical level than at least a second resource identifier of the subset of the plurality of resource identifiers;
            determining user browsing behaviors associated with the first resource identifier and the second resource identifier; and
            based at least in part on the first resource identifier and the second resource identifier sharing at least one syntactical element, first user browsing behaviors associated with the first resource identifier, and second user browsing behaviors associated with the second resource identifier, merging the first resource identifier into the second resource identifier to generate a single resource identifier; and
        generating a policy for downloading one or more of a plurality of resources identified by the resource identifier pattern based at least in part on aggregated user browsing statistics associated with the subset of the plurality of resource identifiers.

2. The method of claim 1, wherein the first resource identifier and the second resource identifier share more than one syntactical element.

3. The method of claim 1, wherein:
    a resource identifier syntax scheme of the website is hierarchical; and
    the resource identifier pattern includes a high-level syntactical element that is the at least one syntactical element shared by the subset of the plurality of resource identifiers.

4. The method of claim 1, wherein the aggregated user browsing statistics comprise at least one of a number of visits to the subset of the plurality of resource identifiers or a number of referral links associated with the subset of the plurality of resource identifiers that were activated by users.

5. The method of claim 1, wherein the generating the policy is based on at least one of in-link transits to a subset of the plurality of resources from other ones of the plurality of resources or out-link transits from the subset of the plurality of resources to the other ones of the plurality of resources.

6. The method of claim 1, wherein the generating the policy is based on an in-link transit to a subset of the plurality of resources from another one of the plurality of resources, and the in-link transit is a propagated in-link transit from a child resource to the other one of the plurality of resources.

7. The method of claim 1, wherein:
the method further comprises determining a plurality of resource identifier patterns for a plurality of subsets of the plurality of resource identifiers; and
the generating the policy includes ranking the plurality of resource identifier patterns based at least on aggregated user browsing statistics for the plurality of resource identifier patterns.

8. The method of claim 1, wherein the user browsing behaviors comprise at least one of:
a number of times that the first resource identifier and the second resource identifier have been accessed;
a number of transits generated from the first resource identifier to other resources and from the second resource identifier to the other resources; or
an amount of time that the first resource identifier and the second resource identifier are viewed.

9. A system, comprising:
one or more processors;
memory communicatively coupled to the one or more processors;
a log processing module stored on the memory and executable by the one or more processors to retrieve user browsing data associated with a plurality of resources of a particular domain, the user browsing data including a plurality of Uniform Resource Locators (URLs) associated with the plurality of resources and user browsing statistics associated with the plurality of resources;
a relationship determination module stored on the memory and executable by the one or more processors to:
create a plurality of URL patterns for the plurality of resources, wherein creating a URL pattern of the plurality of URL patterns comprises:
determining syntactical relationships between two or more URLs of the plurality of URLs;
determining that a first URL of the two or more URLs and a second URL of the two or more URLs share at least one syntactical element;
determining that a syntactical element of the first URL is associated with a lower syntactical level than a syntactical element of the second URL; and
merging the first URL into the second URL to generate the URL pattern based at least in part on the first URL and the second URL sharing at least one syntactical element, first user browsing statistics associated with the first URL, and second user browsing statistics associated with the second URL; and a policy generation module stored on the memory and executable by the one or more processors to rank the plurality of URL patterns based at least on aggregated portions of the user browsing statistics for individual ones of the resources associated with the plurality of URL patterns, and to generate a resource download policy based on relative ranks of the plurality of URL patterns.

10. The system of claim 9, wherein:
the syntactical element of the second URL is associated with a high-level syntactical element that is shared by a subset of URLs of the plurality of URLs; and
the URL pattern is associated with the subset of the plurality of URLs.

11. The system of claim 9, wherein:
a URL syntax scheme of the particular domain is hierarchical; and
the relationship determination module is further configured to create at least one URL pattern of the plurality of URL patterns based on an identification of a subset of URLs of the plurality of URLs at a particular level of hierarchy that share a high-level syntactical element.

12. The system of claim 9, wherein the policy generation module comprises a fetch policy module configured to rank the plurality of URL patterns based at least on numbers of user visits to subsets of the plurality of resources associated with individual URL patterns of the plurality of URL patterns.

13. The system of claim 9, wherein the policy generation module comprises a discovery policy module configured to rank the plurality of URL patterns based at least on a number of links that have been activated by users after browsing to subsets of the plurality of resources associated with individual URL patterns of the plurality of URL patterns.

14. The system of claim 9, wherein:
the log processing module is configured to retrieve second user browsing data associated with a second plurality of resources of a second particular domain, the second user browsing data including a second plurality of URLs associated with the second plurality of resources and third user browsing statistics associated with the second plurality of resources; and
the system further comprises:
a second relationship determination module stored on the memory and executable by the one or more processors to create a second plurality of URL patterns based on other syntactical relationships of the second plurality of URLs and based on the third user browsing statistics; and
a second policy generation module stored on the memory and executable by the one or more processors to rank the second plurality of URL patterns based at least on second aggregated portions of the third user browsing statistics for individual ones of the second resources associated with the second URL patterns, and to create a second resource download policy based on relative ranks of the second plurality of URL patterns.

15. The system of claim 14, wherein the relationship determination module and the second relationship determination module are configured to be executed by the one or more processors in parallel.

16. The system of claim 9, further comprising a web crawl module stored on the memory and executable by the one or more processors to download information from the plurality of resources based on the plurality of URL patterns and the resource download policy.

17. The system of claim 9, wherein the relationship determination module is further executable by the one or more processors to:
- aggregate user browsing statistics associated with merged individual URLs to generate aggregated user browsing statistics; and
- determine an association between the aggregated user browsing statistics and a URL pattern that results from merging the individual URLs.

18. One or more computer-readable storage media storing a plurality of computer-executable instructions that, upon execution by one or more processors of a computing device, cause the computing device to perform acts comprising:
- retrieving a plurality of resource identifiers corresponding to a plurality of resources of a particular domain and user browsing statistics associated with the plurality of resources;
- creating a plurality of resource identifier patterns that identify a subset of the plurality of resource identifiers, the creating comprising:
  - analyzing the plurality of resource identifiers by decomposing hierarchical syntactical elements of individual resource identifiers of the plurality of resource identifiers of the particular domain to identify a syntactical hierarchy associated with the individual resource identifiers;
  - determining, based at least in part on the syntactical hierarchy, that a first resource identifier of the plurality of resource identifiers is associated with a lower syntactical level than a second resource identifier of the plurality of resource identifiers;
  - determining user browsing statistics associated with the first resource identifier and the second resource identifier; and
  - merging the first resource identifier into the second resource identifier based at least in part on the first resource identifier and the second individual resource identifier sharing at least one syntactical element, first user browsing statistics associated with the first resource identifier, and second user browsing statistics associated with the second resource identifier; and
- creating a resource download policy for the particular domain based at least in part on aggregated portions of the user browsing statistics for individual resources of the plurality of resources associated with the plurality of resource identifier patterns.

19. The one or more computer-readable storage media of claim 18, wherein the acts further comprise ranking the plurality of resource identifier patterns based on numbers of user visits to the individual resources.

20. The one or more computer-readable storage media of claim 18, wherein the acts further comprise ranking the plurality of resource identifier patterns based on numbers of referral links of the plurality of resources associated with individual resource identifier patterns of the plurality of resource identifier patterns that were activated by users.

* * * * *